Oct. 18, 1960    A. BELL    2,956,553
GAS SEALING ARRANGEMENT FOR PRESSURIZED LIQUID SYSTEMS
Filed March 21, 1957
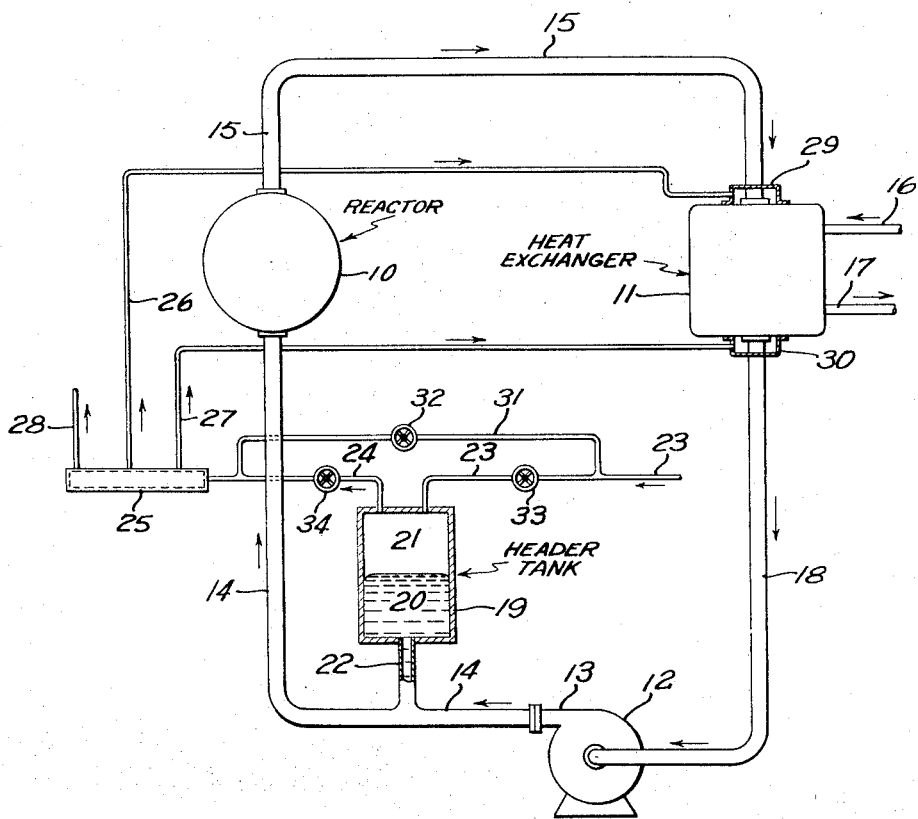
INVENTOR
ALAN BELL
BY
ATTORNEY

United States Patent Office 2,956,553
Patented Oct. 18, 1960

2,956,553

GAS SEALING ARRANGEMENT FOR PRESSURIZED LIQUID SYSTEMS

Alan Bell, Cookham, England, assignor to Foster Wheeler Corporation, New York, N.Y., a corporation of New York Filed Mar. 21, 1957, Ser. No. 647,660

6 Claims. (Cl. 122—32)

This invention relates to a sealing arrangement and more particularly a gas sealing arrangement in a pressurized liquid system wherein a liquid is maintained under pressure by means of a gas, and in which the liquid is of such a nature that any leakage would be undesirable or dangerous.

In pressurized liquid systems, as for example nuclear steam generating systems wherein a liquid, such as liquid sodium or potassium, is circulated through a reactor and heat exchanger, it is usual to supply an inert gas, as for example, argon or nitrogen, to a pressurizer or header tank, which tank is disposed in the system in communication with the liquid and serves as an expansion chamber to allow for changes in the volume of the liquid due to temperature changes or other causes. Gas may be withdrawn from the header tank and delivered to the gas sealing chambers which are provided adjacent various points in the pressurized liquid system, such as valve glands and flanged joints, to provide gas seals at those points where liquid leakage may possibly occur. By providing sealing chambers with gas under pressure, the differential pressure across flanged joints, and the like, is reduced so that likelihood of leakage of liquid at those points is reduced, and enabling the use of ordinary connections and equipment which would otherwise be unsuitable. The gas sealing chambers serve to contain any leakage and can be connected to leak detection devices.

The present invention contemplates in a pressurized liquid system wherein liquid is circulated by means, such as a pump, and is maintained under a pressure by a gas supplied to a pressurizer or header tank, a novel gas sealing arrangement which comprises disposing the pressurizer or header tank in the pressurized liquid system in communication with the liquid where it is at its highest pressure. Means is provided for delivering gas from the header tank, which gas imposes a pressure on the liquid in the system, to a plurality of gas sealing chambers which are disposed around various parts of the system where leakage of liquid is likely to occur so that gas seals are provided which have a pressure greater than the liquid pressure adjacent the gas seals. It is proposed to dispose the header tank or pressurizer in the system at the pump discharge when the liquid at the discharge of the pump is at the highest pressure in the system. Accordingly, it is preferred in the present invention to dispose the pump in the system at the point of maximum hydrostatic pressure of the liquid in the system and the header tank adjacent the discharge end of the pump.

The invention will be better understood from the following description when considered in connection with the accompanying drawings.

The gas sealing arrangement in accordance with the invention is shown in the accompanying schematic drawing as applied to a nuclear steam generating pressurized liquid system wherein a liquid, as for example, liquid sodium or potassium or similar molten metals or alloys, is circulated through a reactor vessel 10 and a heat exchanger 11 by a pump 12. Pump 12 has a discharge outlet 13 which is connected to a conduit 14, the other end of conduit 14 being connected to reactor vessel 10 to deliver liquid to the latter. In reactor 10, the liquid is heated to a high temperature by nuclear reaction and flows from the reactor 10 through a conduit 15 which is connected at one end to the reactor 10 and at the opposite end to heat exchanger 11. The liquid delivered to heat exchanger 11, through conduit 15, passes through heat exchanger 11 in indirect heat exchange relationship with water which is introduced into heat exchanger 11 through inlet connection 16. In heat exchanger 11, the water absorbs heat from the heated liquid and is converted into steam, which stream passes from heat exchanger 11 by way of outlet connection 17. A conduit 18 is connected at one end to heat exchanger 11 and at the other end to the suction side of pump 12 to respectively receive and conduct the cooled liquid from heat exchanger 11 to pump 12 for recirculation through the system.

A pressurizer or header tank 19, having a liquid space 20 and gas space 21 therein, is connected by line 22 to conduit 14 adjacent discharge outlet 13 of pump 12 so that liquid space 20 is in communication with liquid at its highest pressure. Header tank 19 serves as an expansion chamber to allow for changes in volume of the liquid in the system due to temperature changes or other cause. Gas space 21 of header tank 19 is connected by line 23 to a source of insert gas, as for example, nitrogen or argon, which is under a pressure sufficient to maintain the liquid in the system under a relatively high pressure, as for example, 40 p.s.i. gage. Preferably, pump 12 is disposed in the liquid circulating apparatus at the point of maximum hydrostatic head of the liquid so that header tank 19 which is connected adjacent to the discharge side of pump 12 will be disposed in the system where the liquid is at its highest pressure.

A line 24 is connected at one end to a header tank 14 to receive inert gas from gas space 21 and at the opposite end to a manifold 25. To manifold 25, a plurality of gas sealing lines 26, 27 and 28 are connected to receive inert gas supplied to manifold 25 through line 24 and are connected at their opposite ends to a plurality of sealing chambers. For illustration purposes only, lines 26 and 27 are shown communicating with sealing chambers. As shown, line 26 communicates with a sealing chamber 29 which is disposed to enclose the connection between conduit 15 and heat exchanger 11 while line 27 communicates with a sealing chamber 30 which is disposed around the connection between conduit 18 and heat exchanger 11. The number of gas sealing lines is determined by the number of sealing chambers disposed in the system.

A bypass line 31 is connected at one end to gas supply line 23 and at the other end to line 24. Bypass line 31 has a normally closed valve 32 therein while lines 23 and 24 have normally open valves 33 and 34, respectively, which are disposed between header tank 19 and the point at which bypass line 31 connects with lines 23 and 24. When the apparatus is shut down and pump 12 is not in operation, insert gas may be fed directly to the sealing chambers, as for example, chambers 29 and 30, through by-pass line 31, line 24, manifold 25 and lines 26, 27 and 28 by closing valves 33 and 34 and opening valve 32 in bypass line 31.

Since header tank 19 is disposed into the pressurized liquid system where the liquid is at its highest pressure, the gas conducted from header tank 19 to the sealing chambers, i.e. sealing chambers 29 and 30, is at a pressure greater than the pressure of the liquid in the system adjacent the sealing chambers. Therefore, with the gas pressure in the sealing chambers greater than the liquid adjacent thereto, any leakage which may occur in the system at the connections will be of a gas into the liquid rather than an outward escape of liquid from the system.

In a pressurized liquid system, as herein described, which is vertically disposed, the liquid at the discharge side of the pump may not be the point of highest liquid pressure in the system. For example, if the pump is disposed at the top of the system and the hydrostatic pressure of the liquid at the bottom of the system is greater than the pressure drop between the pump discharge and the bottom of the system, the point of highest liquid pressure is at the bottom of the system and not at the pump discharge. Accordingly, the gas sealing arrangement according to this invention would require connecting the header tank in the system at the bottom thereof and not adjacent to the pump.

Although the invention has been illustrated and described as applied to a nuclear steam generating pressurized liquid system, it is to be expressly understood that the invention is not limited thereto. The invention may be applied to any pressurized liquid system wherein a header tank is employed to receive gas to thereby maintain the liquid under pressure and wherein gas seals are desired without departing from the spirit and scope of the invention as the same will now be understood by those skilled in the art.

What is claimed is:

1. In a pressurized liquid system having apparatus through which liquid is circulated by means of conduits connected thereto and wherein the liquid is maintained under pressure by a gas supplied to a header tank, a gas sealing arrangement, comprising means communicating the header tank with the pressurized liquid system at a point in the latter where liquid is at its highest pressure so that the gas pressure in the header tank is greater than the liquid in the system except where the header tank communicates with the liquid, chambers disposed in the pressurized liquid system at the connections between the conduits and the apparatus, and means communicating with the header tank and said chambers to supply gas to the chambers at a pressure greater than the pressure of the liquid flowing through the connections.

2. In a pressurized liquid system having apparatus through which liquid is circulated by means of conduits connected thereto and wherein the liquid is maintained under pressure by means of gas supplied to a header tank, a gas sealing arrangement comprising a pump disposed in the pressurized liquid system for recirculating the liquid through the system, means communicating the header tank with the pressurized liquid system at the discharge side of said pump so that the gas pressure in the header tank is greater than the liquid in the system except where the header tank communicates with the liquid, fluid chambers disposed in the pressurized liquid system at the connections between the conduits and the apparatus, and conduit means communicating with the header tank and said fluid chambers to provide gas in the fluid chambers at a pressure greater than the pressure of the liquid flowing through the connections.

3. The apparatus of claim 2 wherein the pump is connected in the pressurized liquid system at the point where the liquid has maximum hydrostatic head pressure.

4. In a pressurized liquid system having apparatus through which liquid is circulated by means of conduits connected thereto and wherein the liquid is maintained under pressure by means of gas supplied to a header tank having a gas space and a liquid space, a gas sealing arrangement comprising a pump disposed in the pressurized liquid system for recirculating the liquid through the system, means communicating with liquid space of the header tank and the pressurized liquid system at the discharge side of the pump to receive liquid in the liquid space at its highest pressure, means communicating with the gas space of the header tank and a source of gas under pressure to supply gas to said gas space to maintain the liquid under a predetermined pressure, sealing chambers disposed in the pressurized liquid system at the connections between the conducits and the apparatus, and conduit means communicating with the header tank and said sealing chambers to provide gas in the sealing chambers at a pressure greater than the pressure of the liquid flowing through the connections.

5. The gas sealing arrangement of claim 4 wherein means is provided for stopping flow of gas to the header tank and allowing flow of gas directly to the fluid chambers from the source of said gas.

6. In a pressurized liquid system having apparatus through which liquid sodium is circulated by means of conduits connected thereto and wherein sodium is maintained in a liquid state by a heater and under pressure by means of an inert gas supplied to a header tank having a gas space and liquid space therein, a gas sealing arrangement, comprising a circulating pump disposed in the pressurized liquid system where the liquid has maximum hydrostatic head, means communicating the liquid space of the header tank with the pressurized liquid system at the pump discharge to receive liquid sodium in the liquid space from the pump, an inlet line connected at one end to a source of inert gas under pressure and at the other end to the gas space of said header tank to pass inert gas into the gas space of said tank to maintain the liquid sodium under pressure, fluid chambers disposed in the pressurized liquid system at the connection between the conduits and the apparatus, an outlet line connected at one end to the gas space of the header tank to receive inert gas from the latter and at the opposite end to a manifold to deliver inert gas thereto, a plurality of gas sealing lines, each gas sealing line being connected at one end to said manifold to receive inert gas therefrom and connected at the opposite end to a fluid chamber to deliver inert gas to the latter to provide gas in the fluid chambers at a pressure greater than the liquid sodium flowing through the connections, a bypass line connected at one end to the inlet line and at the opposite end to the outlet line, a valve means disposed in the inlet line between the header tank and the connection of the bypass line to the inlet line for controlling flow of gas to the header tank, a second valve means disposed in the outlet line between the header tank and the connection of the bypass line to the outlet line for controlling flow of gas from the header tank, and a third valve means in the bypass line for controlling flow of gas therethrough, said first, second and third valve means being operable to stop gas flow into and out of said header tank and to provide flow of gas through the bypass line whereby inert gas is supplied directly to the fluid chambers.

References Cited in the file of this patent

UNITED STATES PATENTS

| | | |
|---|---|---|
| 1,938,956 | Fee | Dec. 12, 1933 |
| 2,770,590 | Serduke | Nov. 13, 1956 |

OTHER REFERENCES

Proceedings of the International Conference on the Peaceful Uses of Atomic Energy, vol. 3, United Nations, N.Y., 1955, pages 98, 129, 177–181, 221, 256–258, 265 266, 312, 313, 318, 319.

UNITED STATES PATENT OFFICE
CERTIFICATE OF CORRECTION

Patent No. 2,956,553                            October 18, 1960

Alan Bell

It is hereby certified that error appears in the printed specification of the above numbered patent requiring correction and that the said Letters Patent should read as corrected below.

Column 2, lines 28 and 60, for "insert", each occurrence, read -- inert --; line 65, for "into" read -- in --; column 4, line 34, for "connection" read -- connections --.

Signed and sealed this 11th day of April 1961.

(SEAL)
Attest:

ERNEST W. SWIDER
Attesting Officer

ARTHUR W. CROCKER
Acting Commissioner of Patents